United States Patent [19]

Haze

[11] Patent Number: 4,661,920
[45] Date of Patent: Apr. 28, 1987

[54] AUTOMATIC ZERO-ADJUSTMENT METHOD AND APPARATUS

[75] Inventor: Setsuo Haze, Shiga, Japan

[73] Assignee: Kabushiki Kaisha Ishida Koki Seisakusho, Kyoto, Japan

[21] Appl. No.: 605,376

[22] Filed: Apr. 27, 1984

[30] Foreign Application Priority Data

Apr. 27, 1983 [JP] Japan .................... 58-074831

[51] Int. Cl.[4] .................... G01G 19/52; G06F 11/02
[52] U.S. Cl. .................... 364/571; 177/DIG. 3; 177/164; 364/567
[58] Field of Search .................... 364/571, 567; 177/25, 177/50, 164, DIG. 3; 73/1 B

[56] References Cited

U.S. PATENT DOCUMENTS

| | | | |
|---|---|---|---|
| 3,916,173 | 10/1975 | Williams et al. | 177/165 |
| 4,155,411 | 5/1979 | Weaver | 177/165 |
| 4,241,407 | 12/1980 | Sookikian et al. | 364/571 X |
| 4,316,516 | 2/1982 | Kupper | 364/367 X |
| 4,316,517 | 2/1982 | Jonath | 177/DIG. 3 X |
| 4,316,518 | 2/1982 | Jonath | 177/DIG. 3 X |
| 4,417,631 | 11/1983 | Johnson | 177/DIG. 3 X |

FOREIGN PATENT DOCUMENTS

| | | |
|---|---|---|
| 0060701 | 9/1982 | European Pat. Off. . |
| 3036041 | 6/1981 | Fed. Rep. of Germany . |
| 2473705 | 7/1981 | France . |
| 80/01851 | 9/1980 | PCT Int'l Appl. . |

Primary Examiner—Parshotam S. Lall
Assistant Examiner—H. R. Herndon
Attorney, Agent, or Firm—Staas & Halsey

[57] ABSTRACT

A method and apparatus for automatically adjusting the zero point of a weighing machine includes producing, in the form of a digital value, an initial zero-point correction value when the weighing machine is free of a load. The difference value between an unloaded weight value, which is produced by the unloaded weighing machine, and a value obtained by converting the digital value into an analog value, is calculated. The difference value is compared with a preset value, and digital values are sequentially converted in accordance with the result of the comparison operation to render the difference value equal, or nearly equal, to the preset value.

5 Claims, 5 Drawing Figures

AUTOMATIC ZERO-ADJUSTMENT METHOD AND APPARATUS

CROSS-REFERENCE TO RELATED APPLICATION

This application is related to U.S. application Ser. No. 605,375 filed Apr. 27, 1984 now U.S. Pat. No. 4,535,857.

BACKGROUND OF THE INVENTION

This invention relates to a method and apparatus for automatic zero adjustment of a weighing machine for measuring the weighing of articles. More particularly, the invention relates to an automatic zero-adjustment method and apparatus for obtaining the difference between a zero-point correction value and an unloaded weight value (which is produced as an output by a weighing machine when the weighing machine is in an unloaded condition), for changing the zero-point correction value in such a manner that the difference takes on a set value, and for subtracting the difference from a weight value produced as an output by the weighing machine when the weighing machine is subjected to a load.

A weighing machine employed in a combinatorial weighing system or the like includes a weight sensor and a weighing hopper (or weighing dish), the former comprising a load cell. Articles introduced into the weighing hopper are weighed by the weight sensor which applies an output, indicative of the measured weight, is applied to a computerized combinatorial processing unit through an amplifier and an analog-to-digital converter (referred to as an AD converter). The combinatorial processing unit is operable to form combinations of weight values obtained from a plurality of the aforementioned weighing machine constituting the combinatorial weighing system, calculate the total weight of each combination, obtain a combination, referred to as an "optimum combination", whose total weight value is equal to a target weight value or closest to the target weight value within preset allowable limits, discharge the articles from the weighing hoppers of the weighing machines corresponding to the optimum combination, (whereby these weighing hoppers are left empty), resupply the emptied weighing hoppers of these weighing machines with articles in order to prepare for the next weighing cycle, and then repeat the foregoing steps in similar fashion to carry out a continuous automatic weighing operation.

The load cell and amplifier mentioned above have characteristics that vary with temperature. In addition, matter such as powder, oil and residue ascribable to the articles being weighed, affix themselves to the weighing hopper with time. Therefore, unless certain measures are taken, the tare weight signal output from the associated weighing machine tends to vary, thereby making it impossible to maintain good weighing precision. Accordingly, in the prior art, a zero-point adjustment circuit is provided for each and every weighing machine, and a zero-point adjustment is effected by the circuit to deal with a fluctuation in the tare weight value caused by a change in temperature and by the accumulation of residue or the like. However, since this conventional zero-point adjustment is performed by manual control of a variable resistor in the zero-point adjustment circuit, adjustment requires considerable time and effort, particularly when there are a large number of weighing machines.

SUMMARY OF THE INVENTION

Accordingly, an object of the present invention is to provide a zero-point adjustment method and apparatus through which a weighing machine can be subjected to a zero-point adjustment automatically.

Another object of the present invention is to provide a zero-point adjustment method and apparatus through which a weighing machine can be subjected to a zero-point adjustment in a short period of time.

A further object of the present invention is to provide a zero-point adjustment method and apparatus through which a highly precise weighing operation can be performed.

According to the present invention, a subtractor calculates the difference value between a so-called "unloaded" weight value produced by a weighing machine in the unloaded state, and a zero-point correction value produced by a control unit. The zero-point correction value is changed in such a manner that the calculated difference value is made to approach a preset value, and the resulting zero-point correction value is subtracted from a weight value produced by the weighing machine when it is loaded by articles applied thereto, thereby measuring the weight of the articles. According to a characterizing feature of the present invention, the control unit produces, in the form of a digital value, an initial zero-point correction value when the weighing machine is in the unloaded state, the subtractor calculates the difference value between the unloaded weight value (which is produced by the empty weighing machine), and an analog value obtained from a digital-to-analog converter for converting the digital value into said analog value, the difference value and the preset value are compared, and the zero-point correction value is sequentially changed in accordance with the results of the comparison operation to render the difference value equal, or nearly equal, to the preset value.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
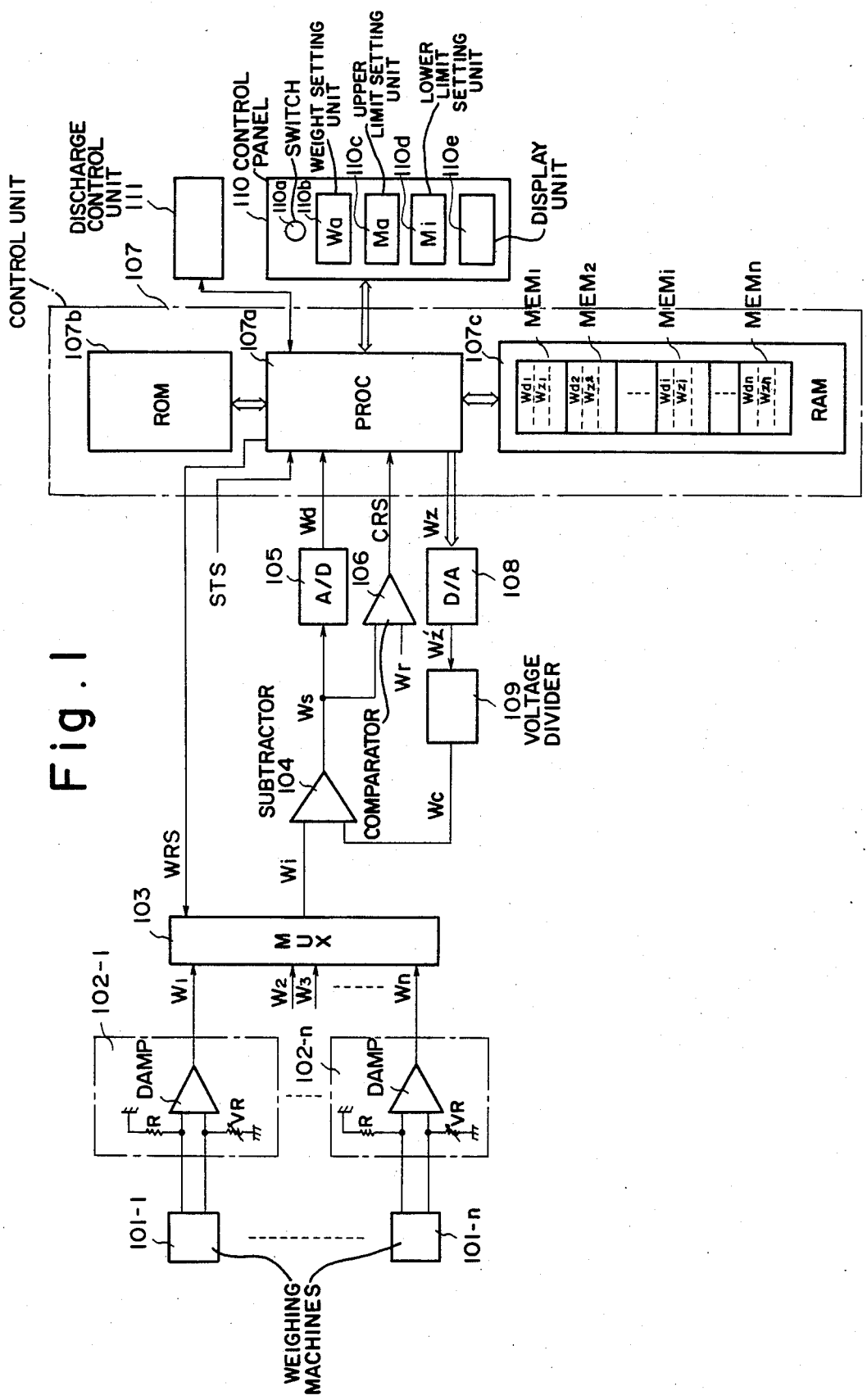
FIG. 1 is a block diagram of an embodiment of an apparatus for practicing the zero-point adjustment method of the present invention.
Figure 2:
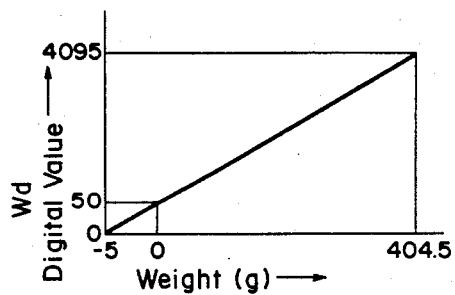
FIG. 2 is a graph of the corresponding relation between the digital value of an output signal, which is produced by an AD converter in the apparatus of FIG. 1, and weight in grams.

Reference will first be had to FIG. 1, which illustrates an apparatus for practicing the zero-point adjustment method of the present invention. Numerals 101-1 . . . 101-n denote n-number of weighing machines each of which comprises a weight sensor and a weighing hopper, not shown. Numerals 102-1 . . . 102-n denote n-number of amplifiers each of which has its input side connected to output terminals of a corresponding one of the weighing machines, each amplifier having a differential amplifier DAMP, a resistor R and a variable resistor VR. The method of adjusting the variable resistor VR is described below. The amplifiers 102-1 . . . 102-n produce respective output signals having values W1 . . . Wn indicative of the amplified weight signals obtained from the weighing machines. A multiplexer 103, comprising an analog switch or the like, receives the weight values Wi (i=1, 2 . . . n) from the amplifiers and delivers these as output signals in successive fashion in response to a weight value read signal WRS, described below. A subtractor 104 calculates the difference Ws between each weight value Wi received from the multiplexer 103, and a zero-point correction value Wc produced by a voltage divider 109. A sequential comparison-type AD converter 105 converts the difference Ws, which is an analog voltage voltage, into a 12-bit digital value Wd. It should be noted that the difference Ws has a value ranging between 0 v and approximately 11 v, and that the digital value Wd ranges between 0 and 4095. The arrangement is such that one digit of the digital value Wd from the AD converter 105 is equivalent to 0.1 g, with a digital value of 0 corresponding to −5 g, a digital value of 50 to 0 g, and a digital value of 4095 to 404.5 g, as shown in FIG. 2. A comparator 106 compares the magnitude of a preset value Wr with that of the difference Ws produced by the subtractor 104, and generates a signal CRS the value of which is logical "1" when Ws>Wr is found to hold. The value Wr is preset to, e.g., 0.12 v, which is equivalent to an output value of approximately 50 from the AD converter 105.

Figure 3:
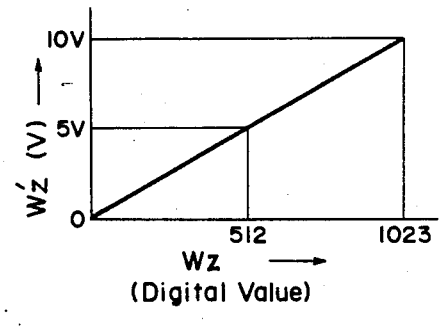
FIG. 3 is a graph of the corresponding relation between the digital value of an input signal, which is applied to a zero-adjustment DA converter in the apparatus of FIG. 1, and the output voltage of the DA converter.

Numeral 107 denotes a control unit comprising a processor 107a for executing processing in accordance with a processing program, a ROM (read-only memory) 107b for storing the processing program (which is for executing span adjustment, automatic zero-point adjustment and combinatorial processing), and a RAM (random-access memory) 107c for the writing and reading of data. The control unit 107 produces a zero-point correction value Wz, which is a 10-bit digital value, and applies the value to a DA converter 108, where the value Wz is converted into a voltage, namely an analog zero-point correction value Wz'. The relation between Wz and Wz' is as shown in FIG. 3. Specifically, the DA converter 108 subjects the digital value Wz to a DA conversion in such a manner that digital values of 1023 and 0 are made equivalent to 10 v and 0 v, respectively, and in such a manner that the output voltage Wz' is made proportional to the input Wz. The output voltage Wz' is applied to the aforementioned voltage divider 109, which is for effecting a level adjustment by dividing the output voltage Wz' of the DA converter 108 by 11 to produce the aforementioned zero-point correction value Wc.

Numeral 110 denotes a control panel including a switch 110a for requesting execution of a zero-point or span adjustment, a weight setting unit 110b for setting a target weight value Wa, an upper limiting setting unit 110c, a lower limit setting unit 110d, and a display unit 110e. The upper and lower limit setting units 110c, 110d are for setting upper and lower (maximum and minimum) limit values Ma, Mi, respectively, of an allowable range desired for the total weight of a combination. Numeral 111 designates a discharge control unit.

Figure 4:
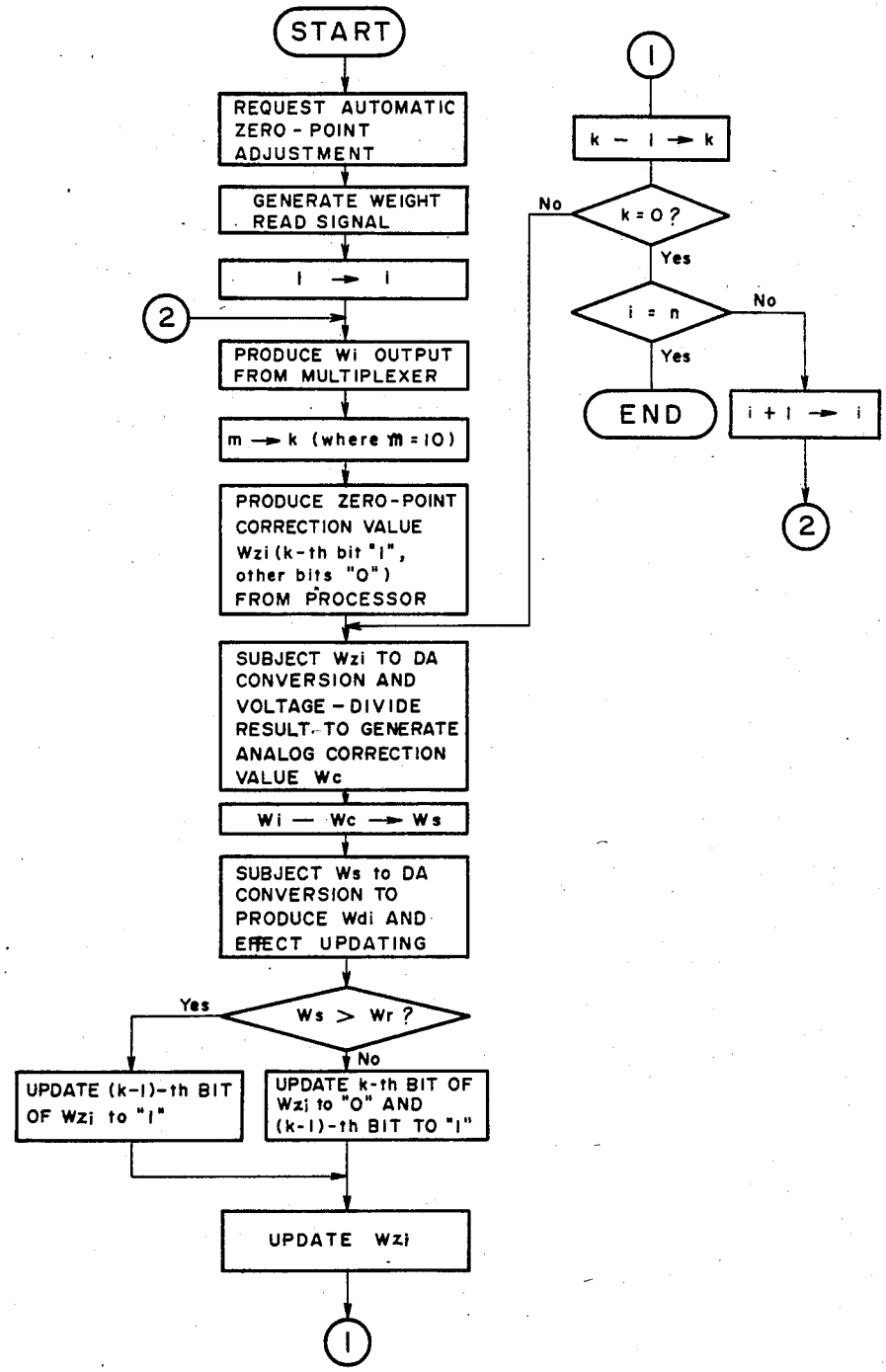
FIG. 4 is a flowchart for the processing for a zero-point adjustment according to the present invention.

Reference will now be had to the flowchart of FIG. 4 to describe an automatic zero-point correction performed by the apparatus of FIG. 1. We will assume that the variable resistors VR of the amplifiers 102-1 through 102-n corresponding to the weighing machines 101-1 through 101-n are to be adjusted at the time that the combinatorial weighing system is installed on-site, and that the adjustment is to be performed, while viewing the display on the display unit 110e of the control panel 110, in such a manner that the zero-point adjustment value Wz (a 10-bit digital value) for each weighing machine takes on a value of 512 (i.e., in such a manner that an output of 0.45 v is produced by the voltage divider 109) when the weighing machines are free of an applied load. This is to effect a conversion into a digital value and make possible a zero-point adjustment with respect to a digital value of 511 even if the zero point should deviate in the positive or minus direction.

(1) To perform a zero-point adjustment, the operator leaves the weighing machines unloaded and presses the switch 110a on the control panel 110 to request an automatic zero-point adjustment of the control unit 107.

(2) When the switch 110a is pressed, the processor 107a delivers the weight value read signal WRS to the multiplexer 103. The latter responds by successively delivering unloaded weight signals W1, W2 . . . Wn received from the respective weighing machines 101-1 . . . 101-n via the amplifiers 102-i (i=1, 2 . . . n). The following description will relate to a particular weight value Wi produced as an output by the multiplexer 103.

(3) Under the control of the zero-point adjustment processing program stored in the ROM 107b, the processor 107a delivers the value 512 in the form of a 10-bit binary numerical value of which only the tenth bit is "1", the first through ninth bits being "0". The value 512 serves as a zero-point correction value Wzi (that is, a zero-point correction value Wz with respect to the weight value Wi). This value is stored in the RAM 107c at a storage area MEMi corresponding to the weighing machine 101-i which has produced the weight value Wi as its output. This initial zero-point correction value (first digital value) 512 (=1000000000) is converted into a voltage, or analog signal, by the DA converter 108, and the voltage is divided by the voltage divider 109 to produce the signal Wc, which is applied to one input terminal of the subtractor 104.

(4) Applied to the other input terminal of the subtractor 104 is the weight value Wi from the weighing machine 101-i, which is in the unloaded state. The subtractor 104 performs the following operation to calculate the difference Ws and produce an output signal indicative thereof:

$$Wi - Wc \rightarrow Ws \quad (1)$$

(5) The difference Ws is applied to the comparator 106, and is converted by the AD converter 105 into a digital value Wdi, which is read in by the processor 107a and stored thereby in the storage area MEMi of the RAM 107c.

(6) The comparator 106, which compares the difference Ws and the preset value Wr in magnitude, produces a logical "1" output when Ws>Wr holds, and a logical "0" output when Ws≦Wr holds.

(7) The processor 107a discriminates the output of the comparator 106, namely the logic level of the output signal CRS produced thereby. If CRS is logical "1" (i.e., Ws>Wr), the ninth bit of the first digital value Wzi is changed to logical "1" (i.e., 1000000000→1100000000); if CRS is logical "0" (i.e., Ws≦Wr), then the tenth bit of the first digital value is changed to logical "0" and the ninth bit is changed to logical "1" (i.e., 1000000000→0100000000). In either case, the resulting digital value, namely a second digital value 768 (=1100000000) or 256 (=0100000000) is produced by the processor 107a as the zero-point correction value Wzi. The processor 107a also uses this second digital value to update the zero-point correction value stored in the storage area MEMi of the RAM 107c. The updated zero-point correction value Wzi is applied to the subtractor 104 through the DA converter 108 and voltage divider 109.

(8) Thereafter, via the foregoing steps (4) through (6), the difference Ws is calculated, Ws is converted into a digital value, the digital value Wdi stored in the storage area MEMi of the RAM 107c is updated, and the magnitude of the difference Ws is compared with the magnitude of the preset value Wr.

(9) If the signal CRS produced by the comparator 106 is logical "1" (Ws>Wr), the processor 107a changes the eighth bit of the second digital value to "1". If CRS is logical "0" (Ws≦Wr), the ninth bit of the second digital value is changed to "0" and the eighth bit to "1". In either case, the result is a third digital value delivered as a new zero-point correction value Wzi. The processor 107a uses this third digital value of update the zero-point correction value Wzi stored in the storage area MEMi of the RAM 107c.

By performing the foregoing steps in the manner described above, the apparatus repeats the processing for calculating the difference Ws, converting the difference into a digital value and comparing the difference Ws and the preset value, as well as the processing for altering the zero-point correction value Wzi based on the result of the comparison step (which processing is similar to the AD conversion processing performed by a sequential-type AD converter). The foregoing process steps are repeated until the first bit of the zero-point correction value is specified, whereby the zero-point correction value Wzi is finally determined. At the instant the zero-point correction value Wzi is delivered by the processor 107a, the difference Ws produced by the subtractor 104 is equal, or nearly equal, to the preset value Wr. It should be noted that the finally determined zero-point correction value Wzi, and the output Wdi of the AD converter 105 that prevails when this zero-point correction value Wzi is produced, are stored in the storage area MEMi of the RAM 107c.

Thereafter, through the foregoing process steps, the zero-point correction values Wz and AD converter outputs Wd for all of the weighing machines 101-1 through 101-n are obtained and stored in the RAM 107c. When this has been accomplished, zero-point adjustment processing ends.

Figure 5:
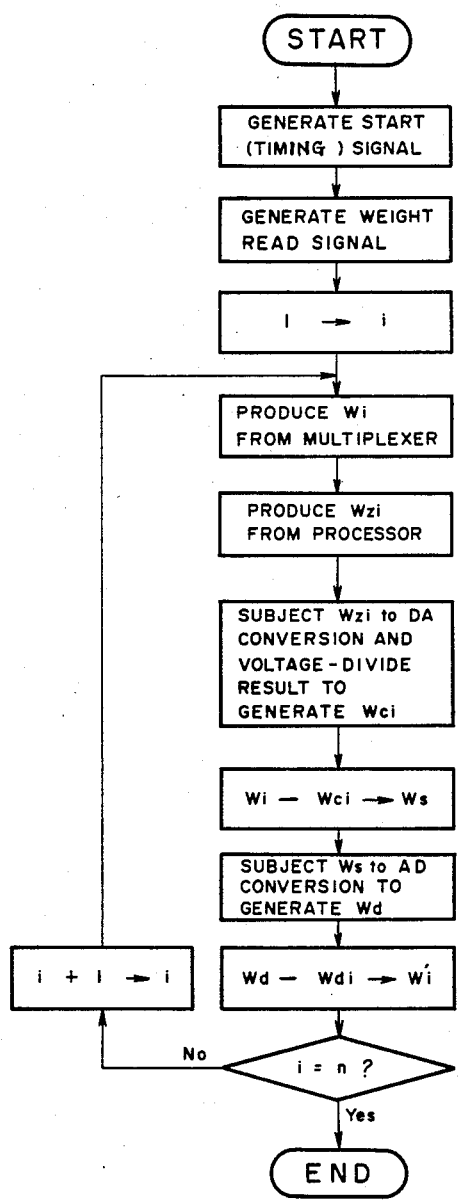
FIG. 5 is a flowchart for the processing for weight measurement.

Upon the completion of zero-point adjustment processing, articles are introduced into the weighing machines 101-1 through 101-n and a start signal (timing signal) STS is produced by a packaging machine (not shown). The control unit 107 responds to the signal STS by executing processing in accordance with the flowchart of FIG. 5 to measure the weight of the articles in each weighing machine. The process steps are as follows:

(a) When the start signal STS is generated, the processor 107a produces the weight value read signal WRS and applies the signal WRS to the multiplexer 103.

(b) The multiplexer 103 responds to the arrival of the weight value read signal WRS by delivering the weight value W1 produced by the weighing machine 101-1, and by supplying the DA converter 108 with the zero-point correction value Wz1 for the weighing machine 101-1, which value is obtained from the storage area MEM1 of the RAM 107c.

(c) Using W1 and the analog zero-point correction value Wc1 produced by the voltage divider 109, the subtractor 104 generates the difference Ws by performing the following operation:

$$W1 - Wc1 \rightarrow Ws \tag{2}$$

The AD converter 105 subjects the difference Ws to an AD conversion and applies the resulting digital value Wd to the processor 107a.

(d) Using the digital value value Wd and the digital Wd1, which has been stored in the storage area MEM1 of the RAM 107c due to the above-described zero-point adjustment processing, the processor 107a performs the following operation:

$$Wd - Wd1 \rightarrow W'1 \tag{3}$$

to calculate the weight W'1 of the articles introduced into the weighing machine 101-1. The processor then stores W'1 in the RAM 107c.

(e) When calculation of the weight W'1 of the articles contained in the weighing machine 101-1 is completed, the multiplexer 103 delivers the weight value W2 received from the weighing machine 101-2 via the amplifier 102-2, and the processor 107a supplies the DA converter 108 with the zero-point correction value Wz2 for the weighing machine 101-2, Wz2 being obtained from the storage area MEM2 of the RAM 107c. The processor 107a then repeats steps (c) and (d) to calculate the weight W'2 of the articles contained in the weighing machine 102-2 and to store W'2 in the RAM 107c.

Thereafter, the control unit 107 calculates the weight values W'i (i=1, 2 ... n) of the articles contained in all of the weighing machines, executes well-known combinatorial processing following completion of the foregoing calculations, calculates the total weight of each of the combinations obtained, finds an optimum combination, namely a combination whose total weight value is equal to the target weight value Wa or closest to the target weight value Wa within preset allowable limits (i.e., between Mi and Ma), sends a discharge signal to the discharge control unit 111 to discharge the articles from the weighing machines corresponding to the optimum combination, and executes the next combinatorial weighing cycle after resupplying the weighing machines that have discharged their articles.

In the illustrated embodiment, all weighing machines are subjected to a zero-point adjustment in sequential fashion before a weighing operation. It should be noted, however, that a zero-point adjustment can be effected for a prescribed weighing machine while a combinatorial weighing operation is in progress. Specifically, according to this approach, after the weighing machines belonging to the optimum combination discharge their articles, a single weighing machine, by way of example, is selected from those which have discharged, this weighing machine is prohibited from being resupplied and then, during the next combinatorial weighing cycle, is subjected to a zero-point adjustment, this being the only weighing machine thus treated. This selected weighing machine is resupplied at the end of this next cycle, namely when the optimum combination of weighing machines selected by this cycle is resupplied.

In the case described above, the present invention is applied to zero-point adjustment of the weighing machines constituting a combinatorial weighing system. However, it goes without saying that the invention is not limited to such application but can be modified in various ways within the scope of the claims.

What I claim is:

1. A combinatorial weighing apparatus including apparatus for automatically adjusting the zero points of weighing machines, comprising:

a plurality of weighing machines for weighing articles and for generating analog signals respectively corresponding to weight values provided by the weighing machines;

a multiplexer, coupled to said weighing machines, for sequentially outputting the analog signals from an output terminal as an analog output signal;

a subtractor, coupled to said multiplexer, for subtracting a zero-point correction value from the analog output signal delivered by said multiplexer to obtain an output value;

an A/D converter, coupled to said subtractor, for converting the output value from said subtractor into a digital value;

a comparator coupled to said subtractor, for comparing the output value from said subtractor with a preset value representing a weight value of zero;

a plurality of memories corresponding the number of said weighing machines, each of said memories for storing a digital weight value for articles weighed by the corresponding one of said weighing machines, and a digital zero-point correction value;

means for executing a combinatorial weighing operation based on the weight values of said weighing machines stored in said memories and for obtaining a prescribed combinatorial weight value;

switching means for switching between a combinatorial weighing mode for executing the combinatorial weighing operation for articles placed on said weighing machines, and a zero-point correction mode for adjusting the zero-point of each of said weighing machines without articles placed on said weighing machines;

arithmetic operation means for calculating the digital zero-point correction values and storing digital zero-point correction values in the respective ones of said memories, in accordance with the output value from said subtractor, for each of said weighing machines, at least one of the digital zero-point correction values being adjusted so that the output value from said subtractor approaches the preset value when said switching means designates the zero-point correction mode, and for sequentially outputting the zero-point correction values stored in said memories corresponding to said weighing machines when said switching means designates the combinatorial weighing mode;

a D/A converter, coupled to said arithmetic operation means, for converting one of the digital zero-point correction values output from said arithmetic operation means into an analog value; and a level adjusting voltage divider, coupled to said D/A converter and said substractor, for converting the analog value from said D/A converter into a prescribed value and for outputting the prescribed value as the zero-point correction value to said subtractor.

2. A method of automatically adjusting the zero-point of a weighing machine which produces a weight value in dependence upon the load thereon, comprising the steps of:

(a) providing a zero-point correction value which is a digital value having m digits, where m is an integer greater than 1;

(b) calculating the difference between the zero-point correction value and the weight value of the weighing machine when it is unloaded, to produce a difference value;

(c) comparing the difference value and a preset value having a predetermined magnitude, and generating a comparison signal;

(d) updating the k-th bit of the zero-point correction value and the (k−1)th bit of the zero-point correction value in dependence upon the comparison signal generated in said step (c); and (e) performing said steps (b), (c) and (d) for each bit of the zero-point correction value from k=m to k=2.

3. The method according to claim 2, further comprising the step of storing the result of said step (e) as a final zero-point correction value.

4. The method according to claim 3, wherein the m-th bit of the zero-point correction value is a first logic level and wherein said step (d) comprises the substeps of:

changing the (k=1)th bit of the zero-point correction value to the first logic level if the difference value is greater than the preset value; and changing the k-th bit of the zero-point correction value to a second logic level and changing the (k=1)th bit of the zero-point correction value to the first logic level if the difference value is less than the preset value.

5. The method according to claim 2, wherein the m-th bit of the zero-point correction value is a first logic level and wherein said step (d) comprises the substeps of:

changing the (k−1)th bit of the zero-point correction value to the first logic level if the difference value is greater than the preset value; and changing the k-th bit of the zero-point correction value to a second logic level and changing the (k−1)th bit of the zero-point correction value to the first logic level if the difference value is less than the preset value.

* * * * *